Patented May 26, 1925.

1,538,895

UNITED STATES PATENT OFFICE.

ALCAN HIRSCH, OF NEW ROCHELLE, AND RAYMOND F. BACON, OF PELHAM, NEW YORK.

ELECTRIC BATTERY.

No Drawing. Application filed February 3, 1923. Serial No. 616,824.

*To all whom it may concern:*

Be it known that we, ALCAN HIRSCH, a citizen of the United States, and resident of New Rochelle, county of Westchester, and State of New York, and RAYMOND F. BACON, a citizen of the United States, and resident of Pelham, county of Westchester, and State of New York, have invented certain new and useful Improvements in Electric Batteries, of which the following is a specification.

Our invention relates to improvements in electric batteries, more particularly to what is commonly known as dry cells.

Such dry cells are commonly made up with a zinc container forming the negative electrode and a solid carbon extending centrally thereof, forming the positive electrode with a mixture containing the electrolyte, etc., between the electrodes. Such cells are usually sealed at the top and the portion of the mixture adjacent the carbon electrode contains graphite powder and a depolarizing agent such as manganese dioxides and other oxidizing agents.

It is characteristic of such cells that upon closing the circuit through a suitable resistance so as to draw a moderate amount of current therefrom, the voltage of the cell quite rapidly drops off and continues to drop off until insufficient for the purposes for which the cell was designed. If the cell be allowed to stand on open circuit for a considerable time, it will in most cases recover its voltage to a considerable extent, but upon putting the same again under load, the voltage again decreases fairly rapidly. For certain classes of work it is desirable that the voltage under load be maintained as nearly constant as possible and the object of our invention is to provide a cell which under moderate load for which it is designed, maintains a more nearly constant voltage throughout a considerable period. We find that this can be accomplished by disseminating mercury in the mixture in the cell, although the correct theory by which the mercury acts to produce this improved result is not wholly clear to us at the present time.

While our improvements may be applied to any suitable or well-known type of cell, we will describe one dry cell which we have found to work admirably. Such cell consists of a zinc cylindrical can or container with the circular carbon electrode extending centrally thereof in the usual manner and provided with an electrolyte paste adjacent the zinc electrode, which paste may be made up for example of five parts of starch, 100 parts of water, 15 parts of ammonium chloride and 10 parts of zinc chloride, the above portions being given by weight. That portion of the mixture adjacent to the carbon electrode and which serves the purpose of depolarizing, may be made up for example, of 350 parts of manganese dioxide, 200 parts of graphite powder, 70 parts of ammonium chloride, 70 parts of zinc chloride, 120 parts of water and to this paste we preferably add 30 parts of mercury or 30 parts of mercurous chloride and thoroughly mix all the ingredients so that the mercury or its salt is thoroughly mixed and disseminated in this depolarizing mixture. These parts are also given by weight. The mercurous chloride is preferred over mercury because it comes in finely divided condition and is more easily thoroughly disseminated throughout the mixture. We believe that when mercurous chloride is used it soon breaks up or decomposes in situ when the cell is put into use, forming metallic mercury disseminated in the mixture. Both metallic mercury and mercurous chloride or other mercury salt may be put in together if desired. Also in some cases 5 parts of mercuric chloride may also be added to the depolarizing paste mixture.

It will be noted from the above that the amount of mercury or mercury compound or salts introduced is relatively small as compared with the amount of manganese dioxide depolarizing agent, so that the depolarizing material does not depend materially, for depolarizing, on the action of a mercury salt or compounds, and the amount of mercury in the mixture is sufficiently small to prevent the voltage of the cell being lowered materially thereby.

Likewise other elements than mercury may be found to accomplish the same result as is obvious to those skilled in the art and in using the term "mercury," we intend to cover thereby mercury in combination as well as in metallic form and the equivalents thereof for the purpose in question. We find that with such inclusion of mercury, the cell under suitable load maintains a very much more nearly constant voltage, for a relatively long period of time thus making the cell adapted for uses for which the ordinary dry cell is not suitable. It will also be obvious that many other changes and modifications may be made, including changes in proportions, without departing from the spirit and scope of the invention as set forth in the appended claims.

What we claim as new and desire to secure by Letters Patent, is:

1. A dry cell having a non-mercurial depolarizing material and metallic mercury disseminated therein to substantially maintain the voltage of the cell under load.

2. A dry cell having a non-mercurial depolarizing material and a relatively small amount of metallic mercury mixed therewith to substantially maintain the voltage of the cell under load.

3. A dry cell having zinc and carbon electrodes with an electrolyte paste therebetween and a non-mercurial depolarizing material adjacent the carbon electrode and metallic mercury admixed therewith to substantially maintain the voltage of the cell under load.

4. A dry cell having zinc and carbon electrodes with an electrolyte paste therebetween and a non-mercurial depolarizing material adjacent the carbon electrode with a relatively small amount of mercury thoroughly disseminated therein.

5. A dry cell having zinc and carbon electrodes and an electrolyte paste therebetween, and a depolarizing agent consisting mainly of manganese dioxide, with a relatively small amount of mercury admixed therewith.

6. A dry cell having zinc and carbon electrodes and an electrolyte paste therebetween and a depolarizing agent consisting mainly of manganese dioxide, with a relatively small amount of mercurous chloride disseminated therein.

7. A dry cell having zinc and carbon electrodes with an electrolyte paste therebetween and a non-mercurial depolarizing material adjacent the carbon electrode, and having a relatively small amount of mercury salt disseminated therein to substantially maintain the voltage of the cell under load.

8. A dry cell having zinc and carbon electrodes with an electrolyte paste therebetween and a non-mercurial depolarizing agent adjacent the carbon electrode, and finely divided mercury disseminated in the paste, the amount being sufficiently small to prevent the voltage of the cell being materially lowered thereby.

In testimony whereof we have signed our names to this specification.

ALCAN HIRSCH.
RAYMOND F. BACON.